(12) United States Patent
Duncan et al.

(10) Patent No.: US 6,991,771 B2
(45) Date of Patent: *Jan. 31, 2006

(54) NOX, HG, AND $SO_2$ REMOVAL USING AMMONIA

(75) Inventors: Joanna L. Duncan, Sanford, ME (US); Christopher R. McLarnon, Exeter, NH (US); Francis R. Alix, Rye, NH (US)

(73) Assignee: Powerspan Corp., Portsmouth, NH (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/707,340

(22) Filed: Dec. 5, 2003

(65) Prior Publication Data
US 2004/0105802 A1 Jun. 3, 2004

Related U.S. Application Data

(63) Continuation-in-part of application No. 09/660,059, filed on Sep. 12, 2000, now abandoned, which is a continuation-in-part of application No. 09/214,358, filed as application No. PCT/US97/18263 on Oct. 9, 1997, now Pat. No. 6,117,403.

(60) Provisional application No. 60/027,905, filed on Oct. 9, 1996.

(51) Int. Cl.
*C01B 17/00* (2006.01)
*C01B 21/00* (2006.01)

(52) U.S. Cl. .............. 423/235; 423/242.1; 423/243.06; 423/243.11

(58) Field of Classification Search ................ 423/235, 423/242.1, 243.06, 243.11
See application file for complete search history.

(56) References Cited

U.S. PATENT DOCUMENTS

| 4,028,071 A | 6/1977 | Langlois |
| 4,029,482 A | 6/1977 | Postma et al. |
| 4,029,739 A | 6/1977 | Senjo et al. |
| 4,035,470 A | 7/1977 | Senjo et al. |
| 4,120,671 A | 10/1978 | Steinmeyer |
| 4,155,726 A | 5/1979 | Steinmeyer |
| 4,193,774 A | 3/1980 | Pilat |
| 4,345,916 A | 8/1982 | Richards et al. |

(Continued)

FOREIGN PATENT DOCUMENTS

DE 4335867 A1 5/1995

(Continued)

OTHER PUBLICATIONS

Lee et al., "The Effect of In Situ Generated Ammonia-Sulfur Aerosols on the Removal of NOx in a Wet ESP", Aug. 20, 2001, Mega Symposium, Chicago, IL.

*Primary Examiner*—Stanley S. Silverman
*Assistant Examiner*—Jonas N. Strickland
(74) *Attorney, Agent, or Firm*—Phillip E. Decker; Mesmer & Deleault, PLLC

(57) ABSTRACT

A process and apparatus for removing $SO_2$, NO, and $NO_2$ from a gas stream having the steps of oxidizing a portion of the NO in the flue gas stream to $NO_2$, scrubbing the $SO_2$, NO, and $NO_2$ with an ammonia scrubbing solution, and removing any ammonia aerosols generated by the scrubbing in a wet electrostatic precipitator. The process can also remove Hg by oxidizing it to HgO and removing it in the wet electrostatic precipitator. Ammonium sulfate, a valuable fertilizer, can be withdrawn from the scrubbing solution.

13 Claims, 2 Drawing Sheets

U.S. PATENT DOCUMENTS

| | | | | |
|---|---|---|---|---|
| 4,435,260 | A | 3/1984 | Koichi et al. | |
| 4,650,555 | A | 3/1987 | Rzad et al. | |
| 4,690,807 | A | 9/1987 | Saleem | |
| 4,726,940 | A | 2/1988 | Kobayashi | |
| 4,735,927 | A | 4/1988 | Gerdes et al. | |
| 4,735,930 | A | 4/1988 | Gerdes et al. | |
| 4,806,320 | A | 2/1989 | Nelson | |
| 4,892,718 | A | 1/1990 | Peter et al. | |
| 4,971,777 | A | 11/1990 | Firnhaber et al. | |
| 5,023,063 | A | 6/1991 | Stiles | |
| 5,041,271 | A | 8/1991 | Aoki et al. | 423/235 |
| 5,176,888 | A | 1/1993 | Stiles | |
| 5,229,091 | A | 7/1993 | Buchanan et al. | |
| 5,308,385 | A | 5/1994 | Winn | |
| 5,362,458 | A | 11/1994 | Saleem et al. | |
| 5,525,317 | A | 6/1996 | Bhat et al. | |
| 5,547,648 | A | 8/1996 | Buchanan et al. | |
| 5,624,649 | A | 4/1997 | Gal | |
| 5,658,547 | A | 8/1997 | Michalak et al. | |
| 5,695,616 | A | 12/1997 | Helfritch et al. | |
| 5,715,764 | A | 2/1998 | Lyngfelt et al. | |
| 5,792,238 | A | 8/1998 | Johnson et al. | |
| 5,846,301 | A | 12/1998 | Johnson et al. | |
| 5,871,703 | A | 2/1999 | Alix et al. | |
| 6,063,352 | A | 5/2000 | Risse et al. | |
| 6,117,403 | A | 9/2000 | Alix et al. | |
| 6,132,692 | A | 10/2000 | Alix et al. | |
| 6,159,440 | A | 12/2000 | Schoubye | |
| 6,168,709 | B1 | 1/2001 | Etter | |
| 6,183,708 | B1 | 2/2001 | Hei et al. | |
| 6,193,934 | B1 | 2/2001 | Yang | |
| 6,221,325 | B1 | 4/2001 | Brown et al. | |
| 6,277,343 | B1 | 8/2001 | Gansley et al. | |
| 6,277,344 | B1 | 8/2001 | Hei et al. | |
| 6,284,022 | B1 | 9/2001 | Sachweh et al. | |
| 6,302,945 | B1 | 10/2001 | Altman et al. | |
| 6,312,505 | B1 | 11/2001 | McQuigg et al. | |
| 6,471,926 | B1 | 10/2002 | Sander | 423/237 |
| 6,530,978 | B2 | 3/2003 | McQuigg et al. | 95/218 |

FOREIGN PATENT DOCUMENTS

| | | |
|---|---|---|
| WO | WO-99/47268 A1 | 9/1999 |
| WO | WO-01/87464 A1 | 11/2001 |

NOX, HG, AND SO$_2$ REMOVAL USING AMMONIA

BACKGROUND OF INVENTION a. Field of the Invention

This invention relates to methods and apparatuses for removing NOx and SO$_2$ from a gas stream.

b. Description of the Related Art

Fossil fuels are burned in many industrial processes. Electric power producers, for example, burn large quantities of coal, oil, and natural gas. Sulfur dioxide ("SO$_2$"), nitrogen oxide ("NO"), and nitrogen dioxide ("NO$^2$") are some of the unwanted byproducts of burning any type of fossil fuel. Mercury ("Hg") is often also found in fossil fuels. These byproducts are known to have serious negative health effects on people, animals, and plants, and a great deal of research has been done to find a way to economically remove them from flue gas streams before they enter the atmosphere.

SO$_2$ is often removed from gas streams ("desulfurization") by scrubbing the gas with an aqueous ammonium sulfate solution containing ammonia. Examples of this process are disclosed in U.S. Pat. Nos. 4,690,807, 5,362,458, 6,277,343, and 6,221,325, which are not admitted to be prior art by their mention in this Background section. The absorbed sulfur compounds react with ammonia to form ammonium sulfite and ammonium bisulfite, which are then oxidized to form ammonium sulfate and ammonium bisulfate. The ammonium bisulfate is further ammoniated to form ammonium sulfate. The process does not remove NO or NO$_2$, however, which must then be dealt with using a different process.

NO and NO$_2$ (together known as "NOx") can be removed from a gas stream by contacting the gas stream with either ClO$_2$ or O$_3$ to convert NO into NO$_2$, and then scrubbing with an aqueous solution of a sulfur-containing reducing compound of alkali metals or ammonia, and a catalytic compound. Such a process is disclosed in U.S. Pat. No. 4,029,739, by Senjo et al., which is not admitted to be prior art by its mention in this Background section. This process, however, does not remove SO$_2$, and requires the addition of chlorine or ozone into the system by some other means.

Some processes exist that remove both NOx and SO$_2$. In one such process disclosed in U.S. Pat. No. 4,035,470, by Senjo et al., which is not admitted to being prior art by its mention in this Background section, NO is oxidized to NO$_2$ by contacting the gas with either ClO$_2$ or O$_3$ as above. Then the SO$_2$ is scrubbed with a sulfite and an oxidation retardant that suppresses oxidation of the sulfite to sulfate. Iron or copper compounds can also be added to depress oxidation. Optionally, ammonium hydroxide can be added to make sulfite and to react with CO$_2$ in the gas stream to make carbonate. Like in U.S. Pat. No. 4,029,739 mentioned above, this process requires the addition of either chlorine or ozone, and further requires a consumable sulfite oxidation retardant. The referenced patent did not mention whether the byproducts included any valuable material like ammonium sulfate. However, both U.S. Pat. Nos. 4,029,739 and 4,035,470 require the addition of chlorine to a gas stream that is eventually released to the atmosphere, creating a serious safety concern.

Yet another process for removing NOx and SO$_2$ from a gas stream is disclosed in U.S. Pat. No. 4,971,777, by Firnhaber et al., which is not admitted to be prior art by its inclusion in this Background section. In this process, NO is oxidized to NO$_2$ by the addition of organic compounds which decompose into radicals at high temperatures. Then an aqueous ammonia solution in which the pH is adjusted to be below 5.0 absorbs the NOx and SO$_2$. Firnhaber teaches the importance of holding the scrubbing solution to a low pH, since higher pH levels produce aerosols of the ammonia salts that he says is an environmental burden to be thwarted. Ammonia aerosols are formed by gas phase reactions of ammonia vapor in the scrubber and create a blue haze or white vapor that emanates from the stack. This is also called "ammonia slip." Free ammonia in the atmosphere would be a serious health and environmental hazard. Firnhaber dismisses the possibility of aerosol removal means due to prohibitive investment costs and high pressure loss, for instance.

What is needed, therefore, is a process that removes SO$_2$, NO, and NO$_2$ from a gas stream that does not require the addition of a catalyst, chlorine, or ozone, can occur at relatively high pH, and does not result in ammonia slip.

SUMMARY OF INVENTION

The present invention is directed to a process and apparatus that removes SO$_2$, NO, and NO$_2$ from a gas stream that does not require the addition of a catalyst, chlorine, or ozone, occurs at a relatively high pH, and does not result in ammonia slip. A process that satisfies these needs comprises the steps of oxidizing NO to NO$_2$, scrubbing SO$_2$, NO, and NO$_2$ from the flue gas stream with an ammonia scrubbing solution having a pH between six and eight, and removing any ammonia aerosols generated by the scrubbing steps with an aerosol removal means. These and other features, aspects, and advantages of the present invention will become better understood with reference to the following description, drawings, and claims.

DETAILED DESCRIPTION

The present invention is a process and apparatus for removing SO$_2$, NO, and NO$_2$ from a gas stream, especially from the flue gas stream of a fossil fuel boiler. In practice, flue gas from the combustion of fossil fuel nearly always contains more NO than NO$_2$, and often contains Hg, which can also be removed from the gas stream by this invention.

The inventors are familiar with methods and apparatuses for removing SO$_2$ and NOx from gas streams. U.S. Pat. Nos. 5,871,703, and 6,117,403 teach the use of an electrical discharge apparatus to oxidize SO$_2$ and NOx to form sulfuric and nitric acids respectively, collecting the acids in a wet electrostatic precipitator ("WESP") to form an effluent, and processing the effluent to make industrial grade acids that can be sold. The inventors on these two patents are Alix, Neister, and McLarnon, two of whom are inventors of the present invention. U.S. Pat. No. 6,132,692 teaches the use of a dielectric barrier discharge ("DBD") reactor to form the same acids, collecting them in a WESP, and draining them from the WESP to remove them from a gas stream. The inventors on this patent are Alix, Neister, McLarnon, and Boyle, two of whom are inventors of the present invention. The above three patents were owned by the owner of the present invention as of the filing date of this specification. They are hereby incorporated by reference as if completely rewritten herein.

Figure 1:
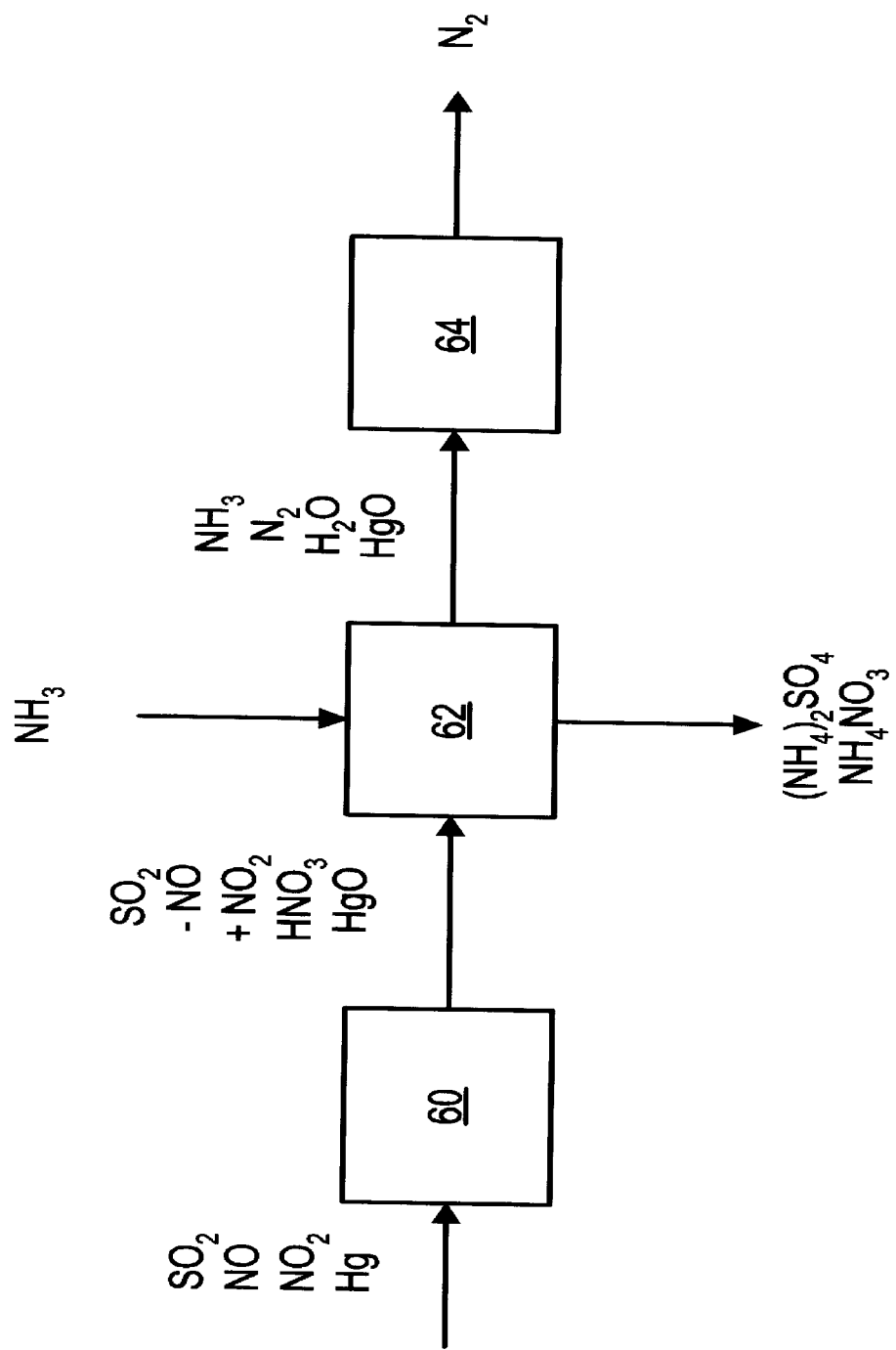
FIG. 1 is a process flow chart showing the process of the present invention.

The present invention comprises a three-step process as shown in FIG. 1. A gas stream comprising $SO_2$, NO, $NO_2$, and perhaps Hg, are present prior to the first step 60. The first step 60 is oxidizing at least a portion of the NO in the flue gas to $NO_2$ with an oxidizing means. The means selected should be able to oxidize greater than about two percent of the NO to $NO_2$, and is preferably in the region of about ninety percent.

The oxidizing step should be adjusted so that the resulting mole ratio of $SO_2$ to $NO_2$ after the oxidizing step should be at least 2.5 to 1. The ratio is preferably four to one, but can be greater. The oxidizing means 60 can be any means known in the art, including but not limited to using an electrical discharge reactor, and injecting $ClO_2$, $O_3$ or certain organic compounds. For example, U.S. Pat. Nos. 4,029,739 and 4,035,470 teachconverting NO to $NO_2$ by the addition of $ClO_2$ or $O_3$ into the gas stream. U.S. Pat. No. 4,971,777 teaches the addition of certain organic compounds that decompose into radicals at high temperatures.

Examples of suitable electrical discharge reactors include corona, pulsed corona, and DBD. DBD is synonymously referred to as silent discharge and non-thermal plasma discharge. It is not the same as corona discharge or pulsed corona discharge. E-beam sources would be at a large economic disadvantage if it could be made to work at all due to the cost of energy and shielding required. In addition, e-beam converts too much $SO_2$ so that it cannot be used for $NO_2$ scrubbing. The preferred embodiment uses a DBD reactor, such as that disclosed in U.S. Pat. No. 6,132,692, by Alix, et al. In practice, the operator of the process will adjust the power input to the reactor to attain the desired oxidation results as a function of the cost of power input to the reactor, desired scrubbing results, and other factors. Laboratory testing has shown that oxidation of at least 90% of the NO and Hg is readily attainable with the present invention.

As taught in U.S. Pat. No. 6,132,692, a DBD reactor will oxidize at least a portion of the NO and $NO_2$ in a gas stream to nitric acid, and at least a portion of the $SO_2$ in a gas stream to sulfuric acid. These acids are dealt with in the next step of the process.

If oxidizing means other than an electrical discharge reactor is used, Hg may or may not be oxidized to HgO. On the other hand, it is possible, and perhaps desirable, that some of the NO and $NO_2$ becomes further oxidized to form $HNO_3$ regardless of the means used. The reason why this may be desirable will be made clear later in this specification.

Another oxidizing means 60 is adding propene or ethylene to the flue gas followed by oxidizing NO to $NO_2$ in the electrical discharge reactor. This would have the advantage of reducing the power input requirement of the electrical discharge reactor to get the same amount of NO to $NO_2$ oxidation. Ethylene can be added in about a 2:1 molar ratio of ethylene to NO. The chemical reaction mechanisms for ethylene conversion of NO to $NO_2$ in an electrical discharge reactor are likely to be as follows:

  (1)

  (2)

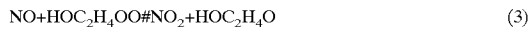  (3)

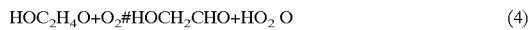  (4)

  (5)

In any event, the output gas stream comprises less NO, more $NO_2$, $SO_2$, perhaps $HNO_3$, perhaps $H_2SO_4$, and perhaps HgO, as shown in FIG. 1.

The second step 62 is scrubbing at least a portion of the $SO_2$, NO, and $NO_2$ present in the gas stream with an aqueous ammonia scrubbing solution. The term "scrubbing"typically means "absorbing"to people having skill in the art, meaning that $SO_2$, NO, and $NO_2$ is absorbed by the aqueous solution. However, it is intended that the term "scrubbing"as used in this specification also includes adding anhydrous ammonia gas to initiate the reactions leading to the oxidation of $SO_2$ and reduction of $NO_2$.

The solution preferably comprises ammonia, ammonium sulfite, ammonium sulfate, and water. The solution preferably has a pH between six and eight, which is much higher than that taught by Firnhaber. Firnhaber teaches that the pH must be kept to less than five, and is preferably 4.5, to prevent the formation of aerosols. However, the present invention is not concerned with avoiding the formation of aerosols because it includes an aerosol removal means 64, described later in this specification.

Maintaining a relatively high pH has several benefits. It increases the speed of absorption of $SO_2$. It increases the ratio of sulfite available in solution compared to bisulfite, which facilitates the oxidation of $SO_2$ and reduction of $NO_2$. The ratio of sulfite to bisulfite is highly dependent on pH level. From these benefits, it follows that the absorption vessel, shown as item 44 in FIG. 2, can be substantially smaller than that used to scrub the same amount of $SO_2$ in a conventional limestone scrubber which is the most typical $SO_2$ scrubber in use today. In addition, the amount of scrubbing liquid required and the liquid to gas ratio can be reduced. It is estimated that the size of the absorption vessel 44 can be reduced by half, and the liquid to gas ratio can be reduced by a third. Because the cost of the absorption vessel and liquid circulating equipment represent a large fraction of the total cost of a scrubber, the ability to substantially reduce the size of the vessel and associated pumps and piping is a major advantage of the present invention over the prior art.

Although FIG. 1 shows ammonia being added at this step, ammonia in the form of ammonium hydroxide can be added instead. The ammonia reacts with the gas stream output from the oxidizing step, forming ammonium sulfite and ammonium bisulfite. The likely chemical reactions in this step are as follows:

  (6)

  (7)

  (8)

An oxidation inhibitor can be added at this step to inhibit the oxidation of sulfite to sulfate before the sulfite can perform its $NO_2$ reduction function. Examples of oxidation inhibitors include thiosulfate and thiourea.

The ammonium bisulfite and ammonium sulfite reacts with the NO and $NO_2$ to form ammonium sulfate. Ammonium sulfate is well known as a valuable agricultural fertilizer. The likely reactions that take place in this step are as follows:

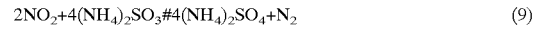  (9)

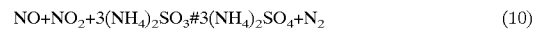  (10)

Most of the $HNO_3$ that may have been formed by further oxidation of NO and $NO_2$, and/or created by a DBD reactor, will react with ammonia and form ammonium nitrate, also known to be a valuable agricultural fertilizer, according to the following formula:

  (11)

In a similar way, most of the sulfuric acid created by the DBD reactor will react with the solution and form ammonium bisulfate, which will then be oxidized to ammonium sulfate. As one can see from the above equations, the process removes $SO_2$, NO, and $NO_2$ from the gas stream, and produces ammonium nitrate, ammonium sulfate, and nitrogen. Over time, the ammonium sulfate and ammonium nitrate will concentrate in the aqueous ammonia solution and precipitate out of solution. The solid precipitate can then be removed from the scrubber and processed for use as fertilizer.

The gas stream after the scrubbing step comprises nitrogen and water. Since the pH of the scrubbing solution is higher than about five, the output from the scrubbing step will likely contain ammonia aerosols. If not collected in the scrubbing solution, the gas stream will also contain HgO.

The third step 64 is removing at least a portion of the ammonia aerosols, ammonia vapor, and the HgO, if present, from the gas stream. A wet electrostatic precipitator ("WESP") may be used as the ammonia removal means. A WESP is effective at collecting ammonia aerosols, ammonia vapor, HgO, and any other aerosols or particles that may be present in the gas stream.

As a result of this three-step process, $SO_2$, NO, $NO_2$, and Hg are removed from a gas stream to provide ammonium sulfate and ammonium nitrate. The output of the aerosol removal means comprises $N_2$ as a result of the process of the present invention.

Figure 2:
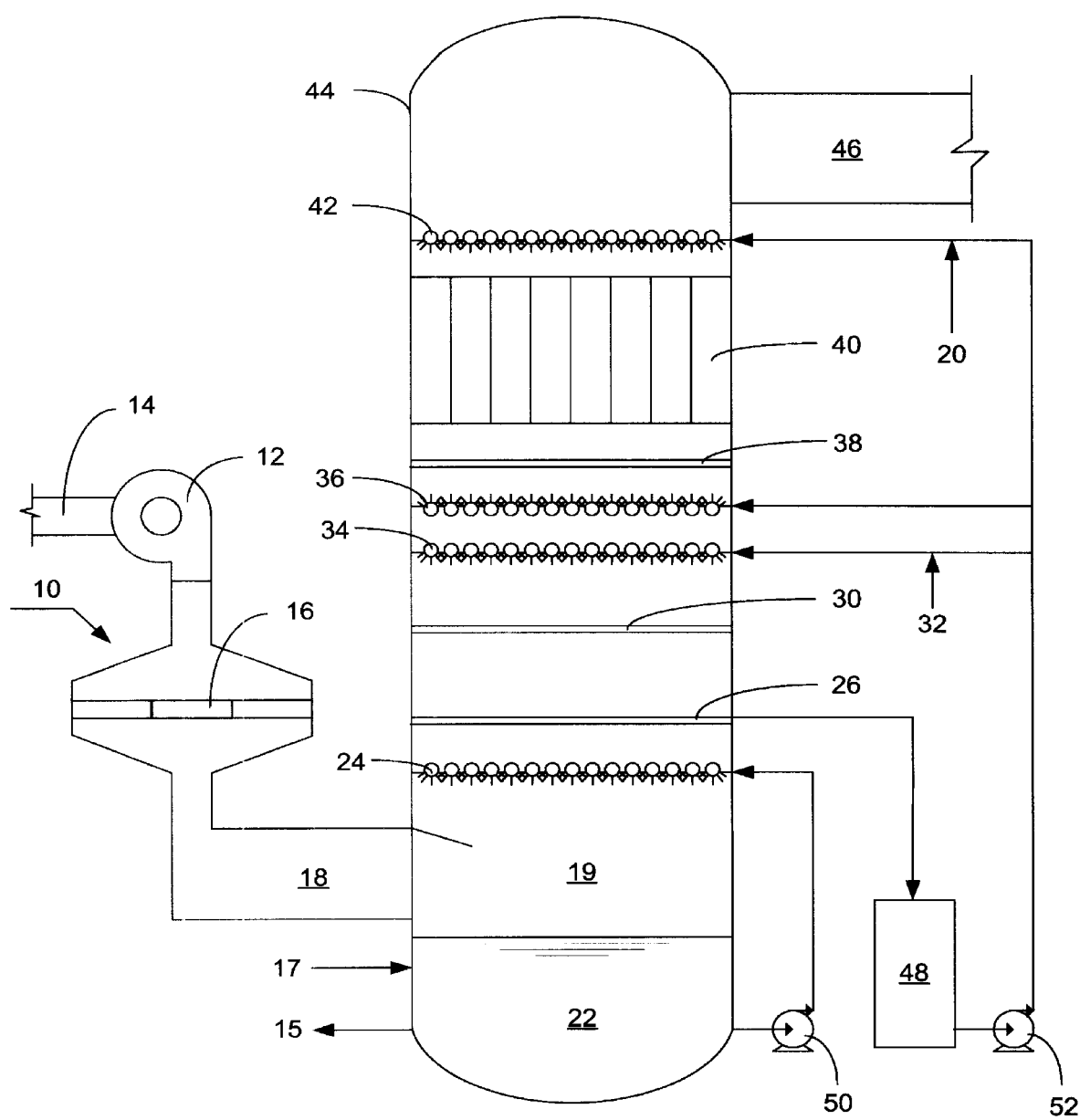
FIG. 2 is a cut-away view of an apparatus according to the present invention.

An apparatus according to the present invention is shown in FIG. 2. A gas stream comprising $SO_2$, NO, $NO_2$, and perhaps Hg 14 enters the apparatus assisted by a forced draft fan 12. The gas then enters a means for oxidizing 10 at least a portion of the NO in the gas stream to $NO_2$. The oxidation means 10 performs the oxidizing step 60 shown in FIG. 1, which is more fully described above. In the preferred embodiment, at least one DBD reactor is used, and can be provided in modules 16 to facilitate manufacture and installation. At least one power supply and controller is required to operate a DBD reactor, which are selected by those having skill in the art, but are not shown in the drawings.

After the oxidation means 10, the gas stream 18 comprises $SO_2$, less NO, more $NO_2$, perhaps $HNO_3$, perhaps $H_2SO_4$ and perhaps HgO. The gas stream temperature at this point is about 350° F. The gas stream then enters a scrubbing vessel 44 in a region 19 over an aqueous ammonium sulfate solution 22. Preferably, the aqueous ammonium sulfate solution comprises ammonia, ammonium sulfite, ammonium sulfate, and water. Water in the ammonium sulfate solution 22 evaporates due to the heat of the gas stream 18, thus concentrating the solution and causing ammonium sulfate 15 to precipitate out of solution, which is then removed from the vessel 44. The removed ammonium sulfate 15 can then be dried and granulated to produce a saleable fertilizer product.

Oxidizer 17 can be introduced into the ammonium sulfate solution 22 for oxidizing ammonium sulfite into ammonium sulfate. Examples of suitable oxidizers for this application include peroxide, potassium permanganate, and a combination of a catalyst plus air. Ammonium sulfate solution 22 is pumped with a circulation pump 50 to a set of lower spray nozzles 24 that serve to cool and saturate the gas stream 18 with water vapor.

Another circulation loop is provided wherein aqueous ammonium sulfite and sulfate in a vessel 48 is pumped with a circulation pump 52 to a set of wash spray nozzles 36 and a set of upper spray nozzles 34. The liquid then falls to a dual flow tray 30. A separator tray 26 allows some of the liquid to fall into the ammonium sulfate solution 22, and the remainder is piped to the vessel 48. Additional makeup ammonia 32 is added to the upper spray nozzles 34. These two circulation loops, independently or together, perform the scrubbing step 62 of FIG. 1, which is described in detail above.

Following the scrubbing loops, a WESP 40 is provided to remove any ammonia aerosols or HgO that may have formed earlier in the process. The WESP 40 is preferably a shell-and-tube type of WESP, but can be a plate type, or any WESP such as is known by those having skill in the art. The WESP 40 is wetted using a set of sprays 42 fed by the ammonium sulfite and sulfate vessel 48 and circulation pump 52 via a conduit 20. A mist eliminator 38 can be provided below the WESP 40. The WESP 40 is an example of the aerosol removal means 64 described in FIG. 1. The gas stream 46 exiting the WESP 40 has considerably less NOx and $SO_2$ than that which entered the process and apparatus, and has an increased amount of the reaction products, which are nitrogen and water.

The following laboratory-scale examples of the process demonstrate the efficacy of the present invention:

EXAMPLE 1

An absorption test was done for the scrubbing step of the process of the present invention, with a solution that was 1% w/w $SO_3^{2-}$ ("sulfite"), 6% w/w $SO_4^{2-}$ ("sulfate"), and 2.5% $S_2O_3^{2-}$ ("thiosulfate") in a packed column that was 18 inches high and 1.5 inches in diameter. The column was packed with ¼ inch glass RASCHIG rings. The simulated flue gas at the inlet of the column contained 13% v/v moisture, 6% v/v $O_2$ and the simulated flue gas pollutants listed in the table. There was continuous addition of $NH_3$ and $(NH_4)_2S_2O_3$ to maintain a pH of 6.8 and a thiosulfate concentration of 2.5% w/w. The residence time in the column was 1.8 sec with an L/G ratio of 25 gpm/kacfm.

The table shows the concentrations of NO, $NO_2$, and $SO_2$ at the inlet and outlet of the test system.

TABLE 1

| | Scrubbing Step Alone | |
|---|---|---|
| | System Inlet | System Outlet |
| NO (ppmv) | 20 | 4 |
| $NO_2$ (ppmv) | 250 | 36 |
| $SO_2$ (ppmv) | 1370 | 2 |

EXAMPLE 2

An absorption test was done for the scrubbing step of the process of the present invention starting with water and a flue gas stream consisting of 13% v/v moisture, 17 ppmv NO, 267 ppmv $NO_2$, 1360 ppmv $SO_2$, 6% v/v $O_2$ and balance $N_2$. Ammonia and ammonium thiosulfate were added to maintain a pH of 6.8 and a thiosulfate concentration of 2.5%, and the concentrations of sulfite and sulfate in the system were allowed to build to steady state. The NOx removal rate was 80% w/w at concentrations of $SO_3^{2-}$, $SO_4^{2-}$ and $S_2O_3^{2-}$ of 0.7% w/w, 2.5% w/w, and 0.5% w/w respectively.

EXAMPLE 3

Tests were conducted in a laboratory test facility for the NO oxidizing, scrubbing, and aerosol removal steps of the process of the present invention. The equipment consisted of a simulated flue gas delivery system, a coaxial cylinder DBD reactor, a packed column scrubber and a tubular WESP. The following is an example of data obtained in the lab test facility.

Simulated flue gas was delivered to the DBD reactor at a flow rate of 14 scfm, a temperature of 290° F. and with the following composition: 6.2% v/v $O_2$, 14.2% v/v $CO_2$, 8.2% v/v $H_2O$, 20 ppmv CO, 250 ppmv $C_2H_4$, 1740 ppmv $SO_2$, and 259 ppmv $NO_x$. Gas velocity through the discharge reactor was 50 ft/sec with discharge power level of 140 watts.

Gas from the discharge reactor entered a 4"ID packed column scrubber, packed with ½"INTALOX saddles to a depth of 4 feet. Liquid was introduced at the top of the scrubber at a flow rate of 0.33 gpm (L/G=20 gpm/kacfm). Aqueous ammonia was added to and effluent liquid removed from the recirculating scrubber solution to maintain a constant total liquid volume and solution pH at 6.6. Gas from the packed bed scrubber was treated in a 4"ID wetted wall electrostatic precipitator with a gas residence time of 0.7 seconds.

The table below shows the concentrations of NO, $NO_2$ and $SO_2$ at the inlet to the system, the outlet of the barrier discharge reactor and at the outlet of the system.

TABLE 2

Three Step Process

|  | System Inlet | Discharge Reactor Outlet | System Outlet |
|---|---|---|---|
| NO (ppmv) | 254 | 45 | 32 |
| $NO_2$ (ppmv) | 5 | 109 | 9 |
| $SO_2$ (ppmv) | 1740 | 1598 | 1 |

The three-step process and apparatus described herein was designed specifically to treat flue gas from a coal fired power plant. However, it can be appreciated that the invention is capable of operating on any gas stream in which NOx and $SO_2$ are present, including but not limited to gas and oil-fired boilers and various chemical manufacturing processes. The NOx and $SO_2$ concentrations and operating conditions will be different in each situation. Therefore, it is understood that an operator or system designer will be motivated to modify the scrubbing step 62 to possibly eliminate the need for either one or both the oxidizing step 60 or the aerosol removal step 64, or combine the three elements somehow so that fewer than three steps are needed.

It will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A process for removing $SO_2$, NO, and $NO_2$ from a gas stream comprising the steps of
   a. oxidizing at least a portion of NO in a gas stream to $NO_2$ with an oxidizing means resulting in a mole ratio of $SO_2$ to $NO_2$ of at least 2.5 to 1, followed by
   b. scrubbing at least a portion of $SO_2$, NO, and $NO_2$ from the gas stream with a scrubbing solution comprising ammonia, and
      having a ph between 5 and 8, and
   c. removing at least a portion of any ammonia aerosols generated from the scrubbing step from the gas stream with an aerosol removal means.

2. The process of claim 1, wherein said oxidizing means is an electrical discharge reactor.

3. The process of claim 2, further comprising the step of oxidizing at least a portion of the NO to $HNO_3$ with said electrical discharge reactor.

4. The process of claim 3, wherein said scrubbing step results in the formation of ammonium nitrate, the process further comprising the step of withdrawing ammonium nitrate from the scrubbing solution.

5. The process of claim 1, wherein said oxidizing step is adapted to result in a mole ratio of $SO_2$ to $NO_2$ of at least four to one.

6. The process of claim 1, said scrubbing solution comprising ammonia, ammonium sulfite, ammonium sulfate, and water and
   having a pH between 5 and 8.

7. The process of claim 1, wherein said aerosol removal means is a wet electrostatic precipitator.

8. The process of claim 1, wherein said scrubbing step results in the formation of ammonium sulfate, the process further comprising the step of withdrawing ammonium sulfate from the scrubbing solution.

9. A process for removing $SO_2$, NO, $NO_2$, and Hg from a gas stream comprising the steps of
   a. oxidizing at least a portion of the NO in a gas stream to $NO_2$, and at least a portion of the Hg in a gas stream to HgO, with an oxidizing means, followed by
   b. scrubbing at least a portion of the $SO_2$, NO, and $NO_2$ from the gas stream with a scrubbing solution comprising ammonia, and
      having a pH between 5 and 8, and
   c. removing at least a portion of any ammonia aerosols generated from the scrubbing step, and HgO, from the gas stream with an aerosol removal means.

10. The process of claim 9, wherein said oxidizing means is an electrical discharge reactor.

11. The process of claim 9, wherein said aerosol removal means is a wet electrostatic precipitator.

12. The process of claim 9, said scrubbing solution comprising ammonia, ammonium sulfite, ammonium sulfate, and water, and
    having a pH between 5 and 8.

13. The process of claim 12, wherein said scrubbing step results in the formation of ammonium sulfate, the process further comprising the step of withdrawing ammonium sulfate from the scrubbing solution.

* * * * *

UNITED STATES PATENT AND TRADEMARK OFFICE
CERTIFICATE OF CORRECTION

PATENT NO. : 6,991,771 B2
DATED : January 31, 2006
INVENTOR(S) : Joanna L. Duncan, Christopher R. McLarnon and Francis R. Alix It is certified that error appears in the above-identified patent and that said Letters Patent is hereby corrected as shown below:

Column 3,
Lines 57, 59, 61 63 and 64, "#" should be -- --> --.

Column 4,
Lines 44, 46, 48, 58, 60 and 67, "#" should be -- --> --.

Signed and Sealed this

Twenty-fifth Day of April, 2006

JON W. DUDAS
*Director of the United States Patent and Trademark Office*